United States Patent
Liu et al.

(10) Patent No.: US 11,908,224 B2
(45) Date of Patent: Feb. 20, 2024

(54) FINGERPRINT IDENTIFICATION STRUCTURE, DRIVING METHOD THEREOF AND ELECTRONIC DEVICE

(71) Applicant: BOE TECHNOLOGY GROUP CO., LTD., Beijing (CN)

(72) Inventors: Yingming Liu, Beijing (CN); Xiaoliang Ding, Beijing (CN); Xiufeng Li, Beijing (CN); Lei Wang, Beijing (CN); Yingzi Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/781,066

(22) PCT Filed: May 21, 2021

(86) PCT No.: PCT/CN2021/095055
§ 371 (c)(1),
(2) Date: May 31, 2022

(87) PCT Pub. No.: WO2021/254090
PCT Pub. Date: Dec. 23, 2021

(65) Prior Publication Data
US 2023/0005290 A1    Jan. 5, 2023

(30) Foreign Application Priority Data

Jun. 19, 2020    (CN) .......................... 202010564736.7

(51) Int. Cl.
*G06K 9/00*    (2022.01)
*G06V 40/13*    (2022.01)
*B06B 1/02*    (2006.01)
*B06B 1/06*    (2006.01)

(52) U.S. Cl.
CPC ........ *G06V 40/1306* (2022.01); *B06B 1/0207* (2013.01); *B06B 1/0692* (2013.01)

(58) Field of Classification Search
CPC .. G06V 40/1306; B06B 1/0207; B06B 1/0692
USPC ........................................................ 310/365
See application file for complete search history.

(56) References Cited

U.S. PATENT DOCUMENTS

2016/0163958 A1*    6/2016    Park .................... G06V 40/1306
                                                              310/365

* cited by examiner

*Primary Examiner* — Abdul-Samad A Adediran
(74) *Attorney, Agent, or Firm* — Chiwin Law LLC

(57) ABSTRACT

Disclosed are a fingerprint identification structure, a driving method thereof and an electronic device. The fingerprint identification structure includes: a driving electrode layer; a piezoelectric material layer; a receiving electrode layer, which includes M receiving electrodes; an auxiliary driving electrode layer, which is located at the side of the piezoelectric material layer away from the receiving electrode layer, and is arranged in a layer different from the driving electrode layer; and a first insulating layer, the auxiliary driving electrode layer includes N auxiliary driving electrodes; the N driving electrodes and the N auxiliary driving electrodes are alternately arranged; and the orthographic projection, on the piezoelectric material layer, of an i-th auxiliary driving electrode overlaps with an interval between the orthographic projections, on the piezoelectric material layer, of an i-th driving electrode and an (i+1)-th driving electrode.

17 Claims, 6 Drawing Sheets

FINGERPRINT IDENTIFICATION STRUCTURE, DRIVING METHOD THEREOF AND ELECTRONIC DEVICE

This application is a U.S. National Phase Entry of International Application No. PCT/CN2021/095055, filed on May 21, 2021, designating the United States of America and claiming priority to Chinese Patent Application No. 202010564736.7 filed with CNIPA on Jun. 19, 2020. The present application claims priority to and the benefit of the above-identified applications and the above-identified applications are incorporated by reference herein in their entirety.

TECHNICAL FIELD

The embodiment of the present disclosure relates to a fingerprint identification structure, a driving method of the fingerprint identification structure, and an electronic device.

BACKGROUND

Fingerprint recognition technology is a kind of technology to identify by comparing the detailed feature points of different fingerprints, to achieve the technology of identification function. With the continuous development of smartphones, under-screen fingerprint recognition technology has become one of the research hotspots and development directions in the current smartphone market. At present, the under-screen fingerprint recognition technology can be divided into under-screen capacitive fingerprint identification technology, under-screen ultrasonic fingerprint identification technology and under-screen optical fingerprint identification technology. The under-screen ultrasonic fingerprint recognition technology has become the most ideal solution due to its advantages of strong penetration, high recognition, and strong anti-fouling ability.

The under-screen ultrasonic fingerprint recognition technology realizes fingerprint recognition through an ultrasonic fingerprint recognition structure. Usually, the ultrasonic fingerprint identification structure is a three-layer structure, which includes a driving electrode, a receiving electrode and a piezoelectric layer between the driving electrode and the receiving electrode. In a case that a driving voltage is applied to the driving electrode and the receiving electrode, the piezoelectric layer is excited by the voltage to generate an inverse piezoelectric effect, and a first ultrasonic wave is emitted outward. After the first ultrasonic wave contacts a finger, the first ultrasonic wave is reflected back to generate a second ultrasonic wave by the finger. because the fingerprint includes valleys and ridges, the vibration intensity of the second ultrasonic wave reflected by the fingerprint and back to the piezoelectric layer is different, at this time, a fixed voltage is applied to the driving electrode, the piezoelectric layer can convert the second ultrasonic wave into a voltage signal, the voltage signal is transmitted to the fingerprint identification module through the receiving electrode, positions of the valleys and ridges of the fingerprint are determined according to the voltage signal.

SUMMARY

Embodiments of the present disclosure provide a fingerprint identification structure, a driving method of the fingerprint identification structure, and an electronic device. The fingerprint identification structure includes: a driving electrode layer, including N driving electrodes arranged at intervals; a piezoelectric material layer, located on a side of the driving electrode layer; a receiving electrode layer, located on a side of the piezoelectric material layer away from the driving electrode layer, and including M receiving electrodes; an auxiliary driving electrode layer, located on a side of the piezoelectric material layer away from the receiving electrode layer, and arranged in a different layer from the driving electrode layer; and a first insulating layer located between the driving electrode layer and the auxiliary driving electrode layer, the auxiliary driving electrode layer includes N auxiliary driving electrodes, the N driving electrodes and the N auxiliary driving electrodes are alternately arranged, an orthographic projection of an i-th auxiliary driving electrode on the piezoelectric material layer is overlapped with an interval between an orthographic projection of an i-th driving electrode on the piezoelectric material layer and an orthographic projection of an (i+1)-th driving electrode on the piezoelectric material layer, M is a positive integer greater than or equal to 2, N is a positive integer greater than or equal to 2, and i is a positive integer greater than or equal to 1 and less than N. In this way, the fingerprint identification structure can drive or excite the piezoelectric material layer located at a position of the interval between adjacent driving electrodes by arranging the auxiliary driving electrode layer, so that the ultrasonic emission efficiency of the fingerprint identification structure is improved, and the ultrasonic emission efficiency is maximized.

At least one embodiment of the present disclosure provides a fingerprint identification structure, which includes: a driving electrode layer, including N driving electrodes arranged at intervals; a piezoelectric material layer, located on a side of the driving electrode layer; a receiving electrode layer, located on a side of the piezoelectric material layer away from the driving electrode layer, and including M receiving electrodes; an auxiliary driving electrode layer, located on a side of the piezoelectric material layer away from the receiving electrode layer, and arranged in a different layer from the driving electrode layer; and a first insulating layer, located between the driving electrode layer and the auxiliary driving electrode layer, the auxiliary driving electrode layer includes N auxiliary driving electrodes, the N driving electrodes and the N auxiliary driving electrodes are alternately arranged, an orthographic projection of an i-th auxiliary driving electrode on the piezoelectric material layer is overlapped with an interval between an orthographic projection of an i-th driving electrode on the piezoelectric material layer and an orthographic projection of an (i+1)-th driving electrode on the piezoelectric material layer, M is a positive integer greater than or equal to 2, N is a positive integer greater than or equal to 2, and i is a positive integer greater than or equal to 1 and less than N.

For example, in the fingerprint identification structure provided by an embodiment of the present disclosure, the interval between the orthographic projection of the i-th driving electrode on the piezoelectric material layer and the orthographic projection of the (i+1)-th driving electrode on the piezoelectric material layer completely falls in the orthographic projection of the i-th auxiliary driving electrode on the piezoelectric material layer.

For example, in the fingerprint identification structure provided by an embodiment of the present disclosure, the i-th driving electrode and the i-th auxiliary driving electrode are configured to receive a same driving signal, and an N-th driving electrode and an N-th auxiliary driving electrode are configured to receive a same driving signal.

For example, in the fingerprint identification structure provided by an embodiment of the present disclosure, the fingerprint identification structure includes a fingerprint identification area and a peripheral area surrounding the fingerprint identification area, the i-th driving electrode and the i-th auxiliary driving electrode are electrically connected in the peripheral area, and an N-th driving electrode and an N-th auxiliary driving electrode are electrically connected in the peripheral area.

For example, in the fingerprint identification structure provided by an embodiment of the present disclosure, an orthographic projection of an N-th auxiliary driving electrode on the piezoelectric material layer is located on a side of an orthographic projection of an N-th driving electrode on the piezoelectric material layer away from an (N−1)-th driving electrode.

For example, in the fingerprint identification structure provided by an embodiment of the present disclosure, the M receiving electrodes are arranged in an array along a first direction and a second direction, the second direction intersects with the first direction, each of the driving electrodes extends along the first direction, the plurality of driving electrodes are arranged along the second direction, an orthographic projection of each of the N driving electrodes on the piezoelectric material layer is overlapped with at least a part of orthographic projections of the plurality of receiving electrodes arranged along the first direction on the piezoelectric material layer.

For example, in the fingerprint identification structure provided by an embodiment of the present disclosure, the fingerprint identification structure further includes: a conductive auxiliary layer, located on a side of the piezoelectric material layer away from the driving electrode layer, and arranged in a different layer from the receiving electrode layer, an orthographic projection of the conductive auxiliary layer on the piezoelectric material layer is overlapped with intervals among orthographic projections of the M receiving electrodes on the piezoelectric material layer.

For example, in the fingerprint identification structure provided by an embodiment of the present disclosure, the conductive auxiliary layer is a conductive mesh, and the conductive mesh is arranged around the M receiving electrodes.

For example, in the fingerprint identification structure provided by an embodiment of the present disclosure, an orthographic projection of the i-th auxiliary driving electrode on the piezoelectric material layer is overlapped with an orthographic projection of the conductive mesh on the piezoelectric material layer, and an orthographic projection of an N-th auxiliary driving electrode on the piezoelectric material layer is overlapped with the orthographic projection of the conductive mesh on the piezoelectric material layer.

For example, in the fingerprint identification structure provided by an embodiment of the present disclosure, the conductive auxiliary layer is configured to be connected to a fixed potential or ground.

For example, in the fingerprint identification structure provided by an embodiment of the present disclosure, the fingerprint identification further includes: a second insulating layer, located between the conductive auxiliary layer and the receiving electrode layer.

For example, in the fingerprint identification structure provided by an embodiment of the present disclosure, the auxiliary driving electrode layer is located on a side of the driving electrode layer away from the piezoelectric material layer.

For example, in the fingerprint identification structure provided by an embodiment of the present disclosure, the fingerprint identification further includes: an acoustic wave reflection layer, located on a side of the auxiliary driving electrode layer away from the piezoelectric material layer; and a third insulating layer, located between the acoustic wave reflection layer and the auxiliary driving electrode layer.

For example, in the fingerprint identification structure provided by an embodiment of the present disclosure, material of the piezoelectric material layer includes polyvinylidene fluoride.

At least one embodiment of the present disclosure provides an electronic device, which includes any one of the abovementioned fingerprint identification structure.

For example, in the electronic device provided by an embodiment of the present disclosure, the electronic device further includes: a driving circuit, the driving circuit is electrically connected with the N driving electrodes and the N auxiliary driving electrodes respectively, and is configured to apply a same driving signal to the i-th driving electrode and the i-th auxiliary driving electrode, and is configured to apply a same driving signal to an N-th driving electrode and an N-th auxiliary driving electrode.

At least one embodiment of the present disclosure provides a driving method of any one of the abovementioned fingerprint identification structure, the method includes: applying a driving voltage to the i-th driving electrode and the i-th auxiliary driving electrode to drive the piezoelectric material layer corresponding to the i-th driving electrode and the i-th auxiliary driving electrode to emit an ultrasonic wave; and using the piezoelectric material layer to receive the ultrasonic wave reflected by a fingerprint, and outputting a corresponding fingerprint electrical signal through at least a part of the M receiving electrodes.

BRIEF DESCRIPTION OF THE DRAWINGS

In order to clearly illustrate the technical solution of the embodiments of the present disclosure, the drawings of the embodiments will be briefly described. It is apparent that the described drawings are only related to some embodiments of the present disclosure and thus are not limitative of the present disclosure.

DETAILED DESCRIPTION

In order to make objects, technical details and advantages of embodiments of the present disclosure clear, the technical solutions of the embodiments will be described in a clearly and fully understandable way in connection with the related drawings. It is apparent that the described embodiments are just a part but not all of the embodiments of the present disclosure. Based on the described embodiments herein, those skilled in the art can obtain, without any inventive work, other embodiment(s) which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. The phrases "connect", "connected", etc., are not intended to define a physical connection or a mechanical connection, but may comprise an electrical connection which is direct or indirect.

Figure 1:
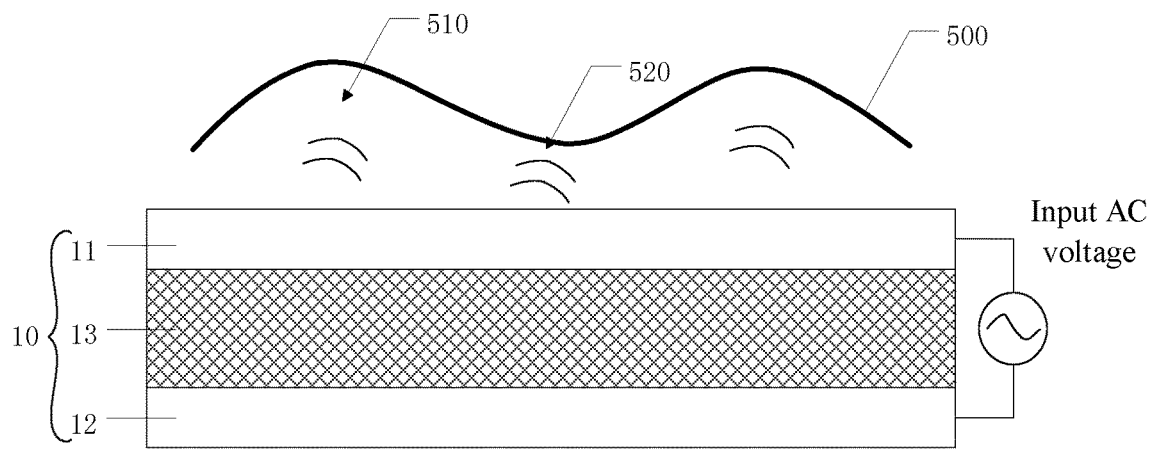
FIG. 1 is a schematic diagram of an ultrasonic wave emitted by a fingerprint identification structure.
Figure 2:
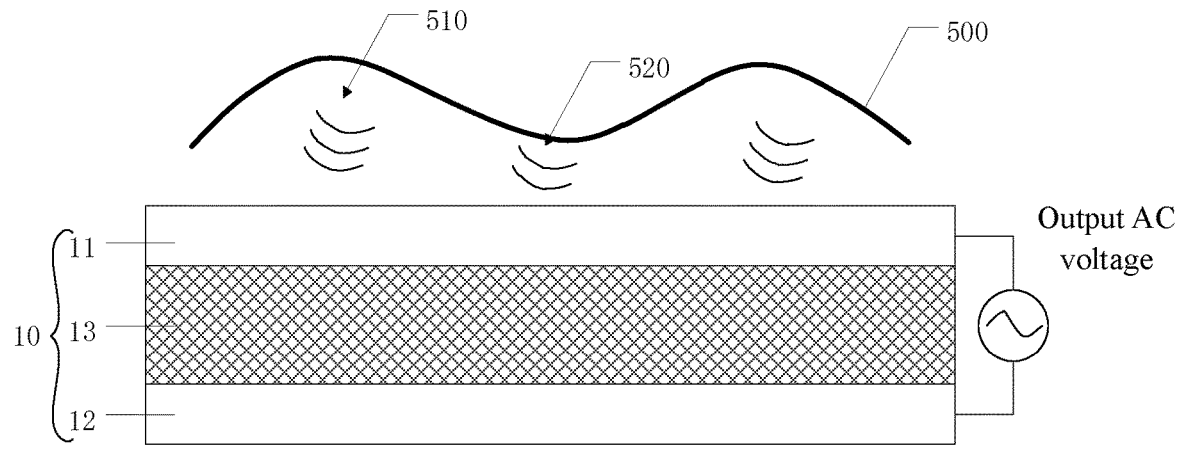
FIG. 2 is a schematic diagram of a fingerprint identification structure receiving an ultrasonic wave.

FIG. 1 is a schematic diagram of an ultrasonic wave emitted by a fingerprint identification structure; FIG. 2 is a schematic diagram of a fingerprint identification structure receiving an ultrasonic wave. As illustrated by FIG. 1, the fingerprint identification structure includes an ultrasonic sensor 10; the ultrasonic sensor 10 includes an upper electrode 11, a lower electrode 12, and a piezoelectric layer 13 between the upper electrode 11 and the lower electrode 12; the piezoelectric layer 13 is made of piezoelectric material and can be excited by a voltage to generate an inverse piezoelectric effect. As illustrated by FIG. 1, in a case that an alternating voltage (AC voltage) is input to the upper electrode 11 and the lower electrode 12 (for example, the upper electrode 11 is grounded, and an AC square wave is applied to the lower electrode 12), the piezoelectric layer 13 will deform due to the inverse piezoelectric effect or drive film layers above and below the piezoelectric layer 13 to vibrate together, so that an ultrasonic wave can be generated and emitted outward. It should be noted that, in a case that a side of the upper electrode 11 away from the piezoelectric layer 13 or a side of the lower electrode 12 away from the piezoelectric layer 13 is provided with a cavity (for example, an air cavity), the ultrasonic wave emitted by the ultrasonic sensor will be strengthened, so that the ultrasonic wave can be emitted better.

As illustrated by FIG. 2, the ultrasonic wave emitted by the ultrasonic sensor 10 is reflected by a fingerprint 500, the reflected ultrasonic wave will be converted into alternating voltage in the piezoelectric layer; at this time, the upper electrode 11 is grounded, the lower electrode 12 can be used as a receiving electrode to receive or induce an alternating voltage generated by the piezoelectric layer. because the fingerprint 500 includes valleys 510 and ridges 520, which have different ability to reflect the ultrasonic wave (valleys 510 have stronger ability to reflect the ultrasonic wave), the intensities of the ultrasonic waves reflected back by the valleys 510 and the ridges 520 are different. Therefore, it can be determined whether the ultrasonic wave is reflected by the valleys or the ridges by the alternating voltage received or induced by the receiving electrode.

Figure 3:
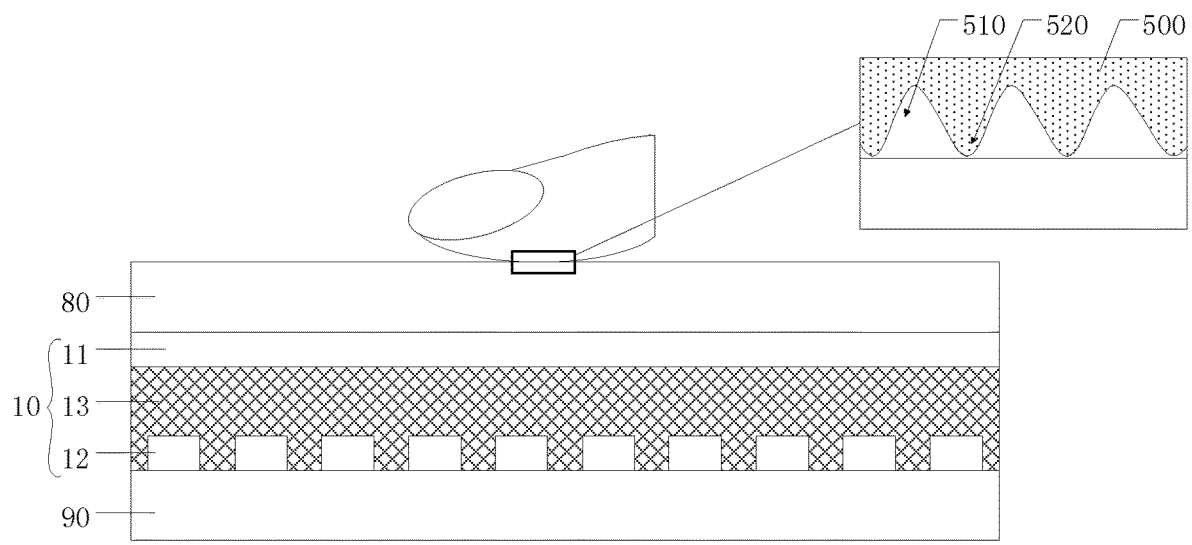
FIG. 3 is a schematic diagram of a fingerprint identification structure for fingerprint identification.

FIG. 3 is a schematic diagram of a fingerprint identification structure for fingerprint identification. As illustrated by FIG. 3, the fingerprint identification structure includes an upper electrode 11, a plurality of lower electrodes 12, a piezoelectric layer 13 located between the upper electrode 11 and the plurality of lower electrodes 12, a substrate 80 on a side of the upper electrode 11 away from the piezoelectric layer 13, and a protective layer 90 located on a side of the plurality of lower electrodes 12 away from the piezoelectric layer 13; the ultrasonic sensor 10 composed of the lower electrode 12, the piezoelectric layer 13 and the plurality of upper electrodes 11 can transmit an ultrasonic wave or receive an ultrasonic wave, that is, the ultrasonic sensor 10 serves as both an ultrasonic transmitting sensor and an ultrasonic receiving sensor. In a case that the fingerprint is in contact with the substrate 80, the ultrasonic wave emitted by the ultrasonic sensor 10 is reflected by the fingerprint 500, the reflected ultrasonic wave will be converted into an alternating voltage in the piezoelectric layer; at this time, the upper electrode 11 is grounded, and the plurality of lower electrodes 12 can be used as receiving electrodes, so that the alternating voltage generated by the piezoelectric layer can be received at different positions. because the fingerprint 500 includes the valleys 510 and the ridges 520, and the valleys 510 and the ridges 520 have different ability to reflect the ultrasonic wave (the valleys 510 have stronger ability to reflect the ultrasonic wave), which results in different intensities of the ultrasonic waves reflected back by the valleys 510 and the ridges 520. Therefore, the position information of the valleys and the ridges of the fingerprint 500 can be obtained through the alternating voltages received by the plurality of lower electrodes 12, thereby fingerprint identification can be realized.

Figure 4:
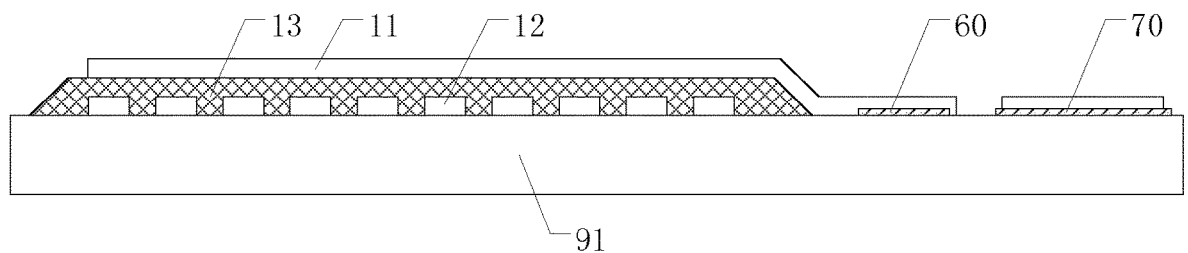
FIG. 4 is a structural schematic diagram of a fingerprint identification structure.

FIG. 4 is a structural schematic diagram of a fingerprint identification structure. As illustrated by FIG. 4, the upper electrode 11, the lower electrode 12 and the piezoelectric layer 13 may all be manufactured on a same side of a thin film transistor substrate 91. The fingerprint identification structure further includes: a bias resistor 60 and a bonding pad 70; the bias resistor 60 can be used to calibrate a voltage, and the bonding pad 70 can be used to bond an external circuit.

Figure 5:
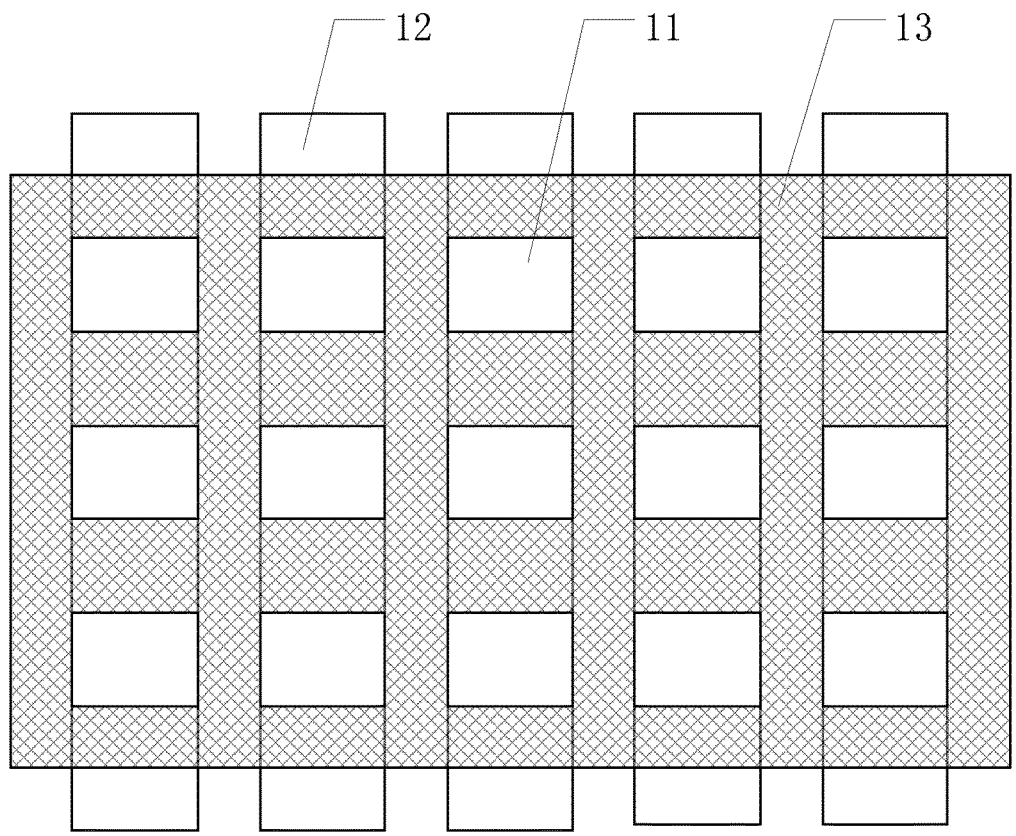
FIG. 5 is a planar schematic diagram of a fingerprint identification structure.

FIG. 5 is a planar schematic diagram of a fingerprint identification structure. As illustrated by FIG. 5, the fingerprint identification structure includes a plurality of receiving electrodes 11 arranged in an array, a plurality of strip-shaped driving electrodes 12, and a piezoelectric layer 13 located between the plurality of receiving electrodes 11 and the plurality of strip-shaped driving electrodes 12. The fingerprint identification structure can realize focusing (phase increasing interference) of the ultrasonic wave by driving the above-mentioned plurality of strip-shaped driving electrodes, so that it can not only improve intensity or energy of the emitted ultrasonic wave in a specific area, thereby improving the fingerprint recognition performance, but also make the emitted ultrasonic wave has better directionality, thereby reducing the crosstalk between the valleys and the ridges of the fingerprint, and thus the fingerprint recognition performance can be improved.

However, because the above-mentioned plurality of strip-shaped driving electrodes need to be driven individually, that is, applying different driving signals, so that the plurality of strip-shaped driving electrodes need to be arranged at intervals, to be insulated from each other. In this case, a space is provided between adjacent strip-shaped driving electrodes, and the piezoelectric layer at a position of the space cannot be excited effectively, therefore, it is impossible to maximize the ultrasonic emission efficiency.

In this regard, embodiments of the present disclosure provide a fingerprint identification structure, a driving method of the fingerprint identification structure, and an electronic device. The fingerprint identification structure includes: a driving electrode layer, including N driving electrodes arranged at intervals; a piezoelectric material layer, located on a side of the driving electrode layer; a receiving electrode layer, located on a side of the piezoelectric material layer away from the driving electrode layer, and including M receiving electrodes; an auxiliary driving electrode layer, located on a side of the piezoelectric material layer away from the receiving electrode layer, and arranged in a different layer from the driving electrode layer; and a first insulating layer located between the driving electrode layer and the auxiliary driving electrode layer, the auxiliary driving electrode layer includes N auxiliary driving electrodes, the N driving electrodes and the N auxiliary driving electrodes are alternately arranged, an orthographic projection of an i-th auxiliary driving electrode on the piezoelectric material layer is overlapped with an interval between an orthographic projection of an i-th driving electrode on the piezoelectric material layer and an orthographic projection of an (i+1)-th driving electrode on the piezoelectric material layer, M is a positive integer greater than or equal to 2, N is a positive integer greater than or equal to 2, and i is a positive integer greater than or equal to 1 and less than N. In this way, the fingerprint identification structure can drive or excite the piezoelectric material layer located at a position of the interval between adjacent driving electrodes by arranging the auxiliary driving electrode layer, so that the ultrasonic emission efficiency of the fingerprint identification structure is improved, and the ultrasonic emission efficiency is maximized.

Hereinafter, the fingerprint identification structure, a driving method of the fingerprint identification structure and the electronic device provided by the embodiments of the present disclosure will be described in detail with reference to the accompanying drawings.

Figure 6A:
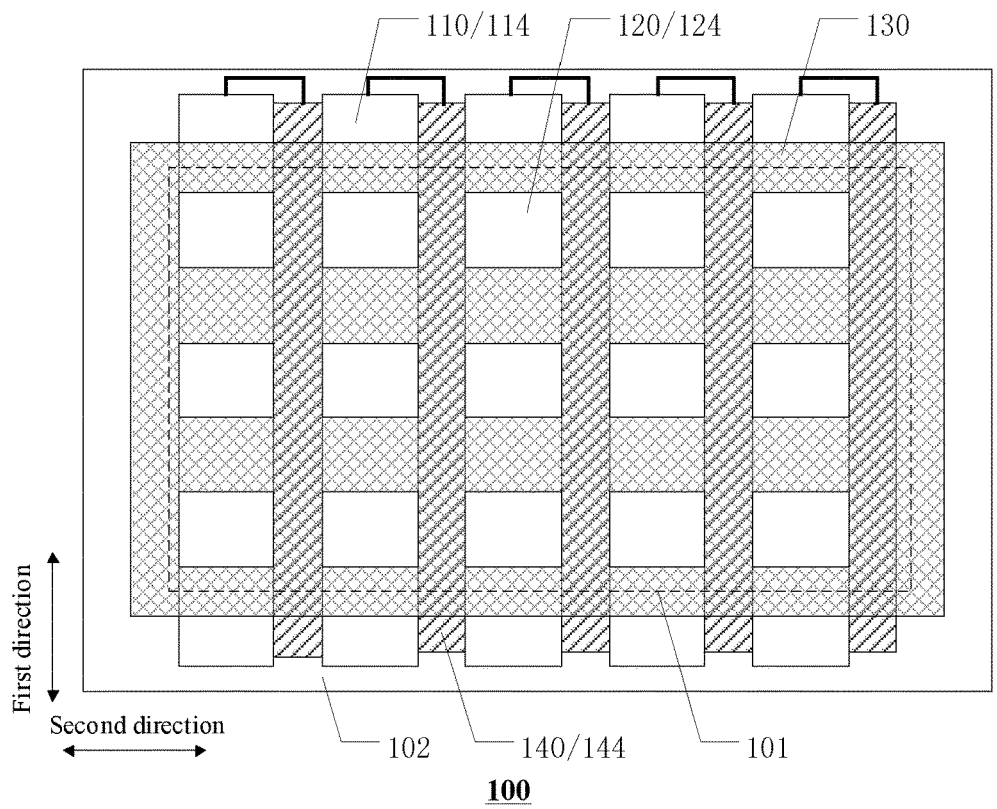
FIG. 6A is a planar diagram of a fingerprint identification structure provided by an embodiment of the present disclosure.
Figure 6B:
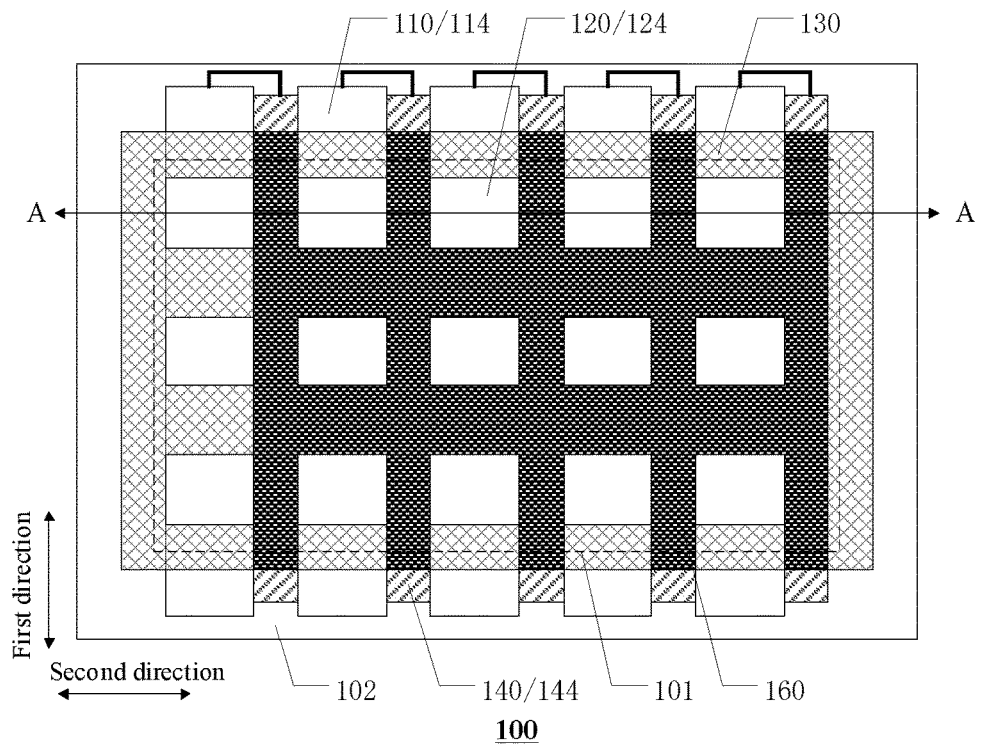
FIG. 6B is a planar diagram of a fingerprint identification structure provided by an embodiment of the present disclosure.

An embodiment of the present disclosure provides a fingerprint identification structure. FIG. 6A is a planar diagram of a fingerprint identification structure provided by an embodiment of the present disclosure; FIG. 6B is a planar diagram of a fingerprint identification structure provided by an embodiment of the present disclosure; and FIG. 7 is a cross-sectional schematic diagram of a fingerprint identification structure along a direction AA in FIG. 6B provided by an embodiment of the present disclosure.

Figure 7:
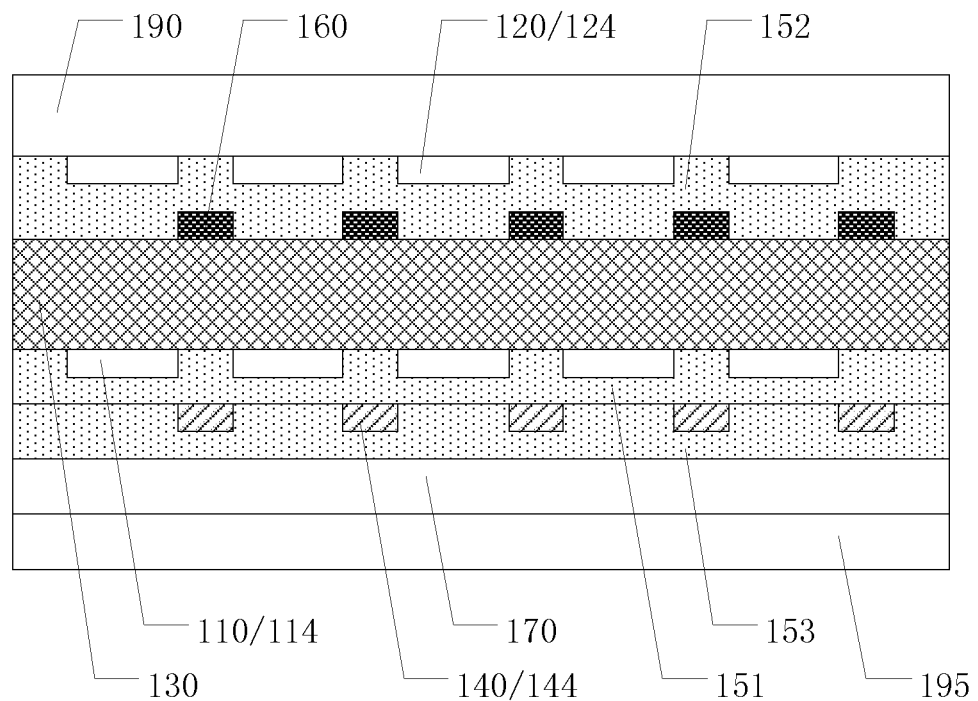
FIG. 7 is a cross-sectional schematic diagram of a fingerprint identification structure along a direction AA in FIG. 6B provided by an embodiment of the present disclosure.

As illustrated by FIG. 6A, FIG. 6B and FIG. 7, the fingerprint identification structure 100 includes a driving electrode layer 110, a receiving electrode layer 120, a piezoelectric material layer 130, an auxiliary driving electrode layer 140 and a first insulating layer 151; the piezoelectric material layer 130 is located on a side of the driving electrode layer 110, the receiving electrode layer 120 is located on a side of the piezoelectric material layer 130 away from the driving electrode layer 110, that is, the piezoelectric material layer 130 is located between the driving electrode layer 110 and the receiving electrode layer 120; the auxiliary driving electrode layer 140 is located on a side of the piezoelectric material layer 130 away from the receiving electrode layer 120, and is arranged in a different layer from the driving electrode layer 110; the first insulating layer 151 is located between the driving electrode layer 110 and the auxiliary driving electrode layer 140. The driving electrode layer 110 includes N driving electrodes 114 arranged at intervals; the receiving electrode layer 120 includes M receiving electrodes 124; the auxiliary driving electrode layer 140 includes N auxiliary driving electrodes 144; the N driving electrodes 114 and the N auxiliary driving electrodes 144 are alternately arranged, an orthographic projection of an i-th auxiliary driving electrode 144 on the piezoelectric material layer 130 is overlapped with an interval between an orthographic projection of an i-th driving electrode 114 on the piezoelectric material layer 130 and an orthographic projection of an (i+1)-th driving electrode 114 on the piezoelectric material layer 130, M is a positive integer greater than or equal to 2, N is a positive integer greater than or equal to 2, and i is a positive integer greater than or equal to 1 and less than N.

In the fingerprint identification structure provided by the embodiment of the present disclosure, because the orthographic projection of the i-th auxiliary driving electrode on the piezoelectric material layer is overlapped with the interval between the orthographic projections of the i-th driving electrode and the (i+1)-th driving electrode on the piezoelectric material layer, the fingerprint identification structure can drive or excite the piezoelectric material layer located at the interval between adjacent driving electrodes by arranging the auxiliary driving electrode layer, so that the ultrasonic emission efficiency of the fingerprint identification structure is improved, and the ultrasonic emission efficiency is maximized.

For example, a material of the driving electrodes includes one or more selected from the group consisting of copper, silver and aluminum; a material of the receiving electrodes may also include one or more selected from the group consisting of copper, silver and aluminum. Of course, the materials of the driving electrodes and the receiving electrodes can also be other suitable conductive materials, which are not limited in the embodiment of the present disclosure.

In some examples, as illustrated by FIGS. 6A, 6B, and 7, the interval between the orthographic projection of the i-th driving electrode 114 on the piezoelectric material layer 130 and the orthographic projection of the (i+1)-th driving electrode 114 on the piezoelectric material layer 130 completely falls in the orthographic projection of the i-th auxiliary driving electrode 144 on the piezoelectric material layer 130. That is, the interval between the orthographic projections of the two adjacent driving electrodes 114 on the piezoelectric material layer 130 completely falls within the orthographic projection of the corresponding auxiliary driving electrode 144 on the piezoelectric material layer 130. In this way, the fingerprint identification structure can utilize the auxiliary driving electrodes to a maximum extent to drive or excite the piezoelectric material layer located at a position of the interval between the adjacent driving electrodes.

In some examples, as illustrated by FIGS. 6A, 6B, and 7, the i-th driving electrode 114 and the i-th auxiliary driving electrode 144 are configured to receive the same driving signal, an N-th driving electrode 114 and an N-th auxiliary driving electrode 144 are configured to receive the same driving signal. That is, the i-th driving electrode 114 and the i-th auxiliary driving electrode 144 can apply a driving voltage to the piezoelectric material layer 130 as a whole, and the N-th driving electrode 114 and the N-th auxiliary driving electrode 144 may apply a driving voltage to the piezoelectric material layer 130 as a whole.

For example, after applying the driving voltage to the i-th driving electrode and the i-th auxiliary driving electrode, the piezoelectric material layer corresponding to the i-th driving electrode and the i-th auxiliary driving electrode will deform due to the inverse piezoelectric effect or drive film layers above and below the piezoelectric material layer to vibrate together, so that an ultrasonic wave can be generated and emitted outward. In this way, compared with a case of driving only by the driving electrodes, the fingerprint identification structure can drive or excite a larger area of the piezoelectric material layer through the i-th driving electrode and the i-th auxiliary driving electrode, so that the ultrasonic emission efficiency of the fingerprint identification structure is improved, and the ultrasonic emission efficiency is maximized. On the other hand, the fingerprint identification structure can also realize the focusing (phase increasing interference) of the ultrasonic wave by driving the above-mentioned plurality of driving electrodes respectively, so that it can not only increase the intensity or energy of the emitted ultrasonic wave in a specific area, thereby improving the fingerprint recognition performance, but also make the emitted ultrasonic wave has better directionality, thereby reducing the crosstalk between the valleys and the ridges of the fingerprint, and thus the fingerprint recognition performance can be improved. In a case that the fingerprint recognition structure improves the intensity or energy of the emitted ultrasonic wave in a specific area or a specific direction by realizing the focusing (phase increasing interference) of the ultrasonic wave, the fingerprint identification structure can not only realize fingerprint identification, but also penetrate fingers, to identify whether the fingerprint is real skin.

In some examples, as illustrated by FIGS. 6A and 6B, the fingerprint identification structure 100 includes a fingerprint identification area 101 and a peripheral area 102 surrounding the fingerprint identification area 101, the i-th driving electrode 114 and the i-th auxiliary driving electrode 144 are electrically connected in the peripheral area 102, the N-th driving electrode 114 and the N-th auxiliary driving electrode 144 are electrically connected in the peripheral area 102. In this way, the i-th driving electrode 114 and the i-th auxiliary driving electrode 144 can be applied with a same driving signal by the driving circuit, the N-th driving electrode 114 and the N-th auxiliary driving electrode 144 may be applied with a same driving signal by the driving circuit.

In some examples, as illustrated by FIGS. 6A, 6B, and 7, an orthographic projection of the N-th auxiliary driving electrode 144 on the piezoelectric material layer 130 is located on a side of the orthographic projection of the N-th driving electrode 114 on the piezoelectric material layer 130 away from the (N−1)-th driving electrode 114.

In some examples, as illustrated by FIGS. 6A, 6B, and 7, the M receiving electrodes 124 are arranged in an array along a first direction and a second direction, the second direction intersects with the first direction, each of the driving electrodes 114 extends along the first direction, the plurality of driving electrodes 114 are arranged along the second direction, an orthographic projection of each of the N driving electrodes 114 on the piezoelectric material layer 130 is overlapped with at least a part of orthographic projections of the plurality of receiving electrodes 124 arranged along the first direction on the piezoelectric material layer 130.

For example, each of the above-mentioned driving electrodes 114 may be strip-shaped driving electrodes extending along the first direction, and a width of the strip-shaped driving electrodes can be in the range of 50 microns to 70 microns.

Different from the fingerprint identification structure illustrated in FIG. 6A, the fingerprint identification structure illustrated in FIG. 6B and FIG. 7 further includes a conductive auxiliary layer 160. The conductive auxiliary layer 160 is located on a side of the piezoelectric material layer 130 away from the driving electrode layer 110, and is arranged in a different layer from the receiving electrode layer 120, an orthographic projection of the conductive auxiliary layer 160 on the piezoelectric material layer 130 is overlapped with intervals among orthographic projections of the M receiving electrodes 124 on the piezoelectric material layer 130. That is, the conductive auxiliary layer 160 is arranged at a position between the M receiving electrodes 124. In this way, the conductive auxiliary layer 160 may be arranged opposite to the auxiliary driving layer 140, so that each of the auxiliary driving electrodes can better generate an electric field with the conductive auxiliary layer, thereby driving the piezoelectric material layer.

In some examples, as illustrated by FIGS. 6B and 7, the conductive auxiliary layer 160 is a conductive mesh, and the conductive mesh is arranged around the M receiving electrodes 124. In this way, the conductive mesh can be applied with a fixed potential or grounded as a whole, so as to generate an electric field with the auxiliary driving electrode.

In some examples, as illustrated by FIGS. 6B and 7, an orthographic projection of the i-th auxiliary driving electrode 114 on the piezoelectric material layer 130 is overlapped with an orthographic projection of the conductive mesh 160 on the piezoelectric material layer 130, and an orthographic projection of an N-th auxiliary driving electrode 114 on the piezoelectric material layer is overlapped with the orthographic projection of the conductive mesh 160 on the piezoelectric material layer 130. In this way, the conductive auxiliary layer 160 may be arranged opposite to the auxiliary driving layer 140, so that each of the auxiliary driving electrodes can better generate an electric field with the conductive auxiliary layer, thereby driving the piezoelectric material layer.

In some examples, the conductive auxiliary layer 160 is configured to be connected to a fixed potential or ground.

In some examples, as illustrated by FIG. 7, the fingerprint identification structure 100 further includes: a second insulating layer 152 located between the conductive auxiliary layer 160 and the receiving electrode layer 124.

In some examples, as illustrated by FIG. 7, the auxiliary driving electrode layer 140 is located on a side of the driving electrode layer 120 away from the piezoelectric material layer 130. because an area of each of the driving electrodes 114 in the driving electrode layer 120 is larger than an area of each of the auxiliary driving electrodes 144 in the auxiliary driving electrode layer 140, thus the driving electrode layer 120 is arranged closer to the piezoelectric material layer 130, even in contact with the piezoelectric material layer 130, and the ultrasonic emission efficiency can be improved.

In some examples, as illustrated by FIG. 7, the conductive auxiliary layer 160 is located on a side of the receiving electrode layer 120 close to the piezoelectric material layer 130. At this time, the above-mentioned second insulating layer 152 is arranged between the receiving electrode layer 120 and the piezoelectric material layer 130, the second insulating layer 152 can prevent the piezoelectric material layer 130 from being broken down by the driving voltage, a larger charge or voltage enters the receiving electrodes from the piezoelectric material layer and destroys the receiving circuits connected with the receiving electrodes. In this way, the fingerprint identification structure has high security and stability. It should be noted that, the receiving electrode can read out the information about the reflected ultrasonic wave on the piezoelectric material layer by sensing the charge or voltage on the piezoelectric material layer.

In some examples, as illustrated by FIG. 7, the fingerprint identification structure 100 further includes: an acoustic wave reflection layer 170, located on a side of the auxiliary driving electrode layer 140 away from the piezoelectric material layer 130; and a third insulating layer 153, located between the acoustic wave reflection layer 170 and the auxiliary driving electrode layer 140.

In some examples, material of the piezoelectric material layer includes polyvinylidene fluoride. Of course, the embodiments of the present disclosure include but are not limited to this, the piezoelectric material layer may also be made of piezoelectric materials such as aluminum nitride (ALN), and lead zirconate titanate piezoelectric ceramics (PZT).

In some examples, as illustrated by FIG. 7, the fingerprint identification structure 100 further includes: a receiving circuit layer 190, which is located on a side of the receiving electrode layer 120 away from the piezoelectric material layer 130. The receiving circuit layer 190 may include M receiving circuit units (not illustrated); the M receiving circuit units are arranged in a one-to-one correspondence to the above-mentioned M receiving electrodes, so that the signals from the M receiving electrodes are received.

In some examples, as illustrated by FIG. 7, the fingerprint identification structure 100 further includes: a protective layer 195 located on a side of the acoustic wave reflection layer 170 away from the auxiliary driving electrode layer 140, and the protective layer 195 can protect the fingerprint identification structure 100.

For example, material of the protective layer can be selected from an organic insulating material, such as epoxy resin. Of course, the embodiments of the present disclosure include but are not limited to this.

Figure 8:
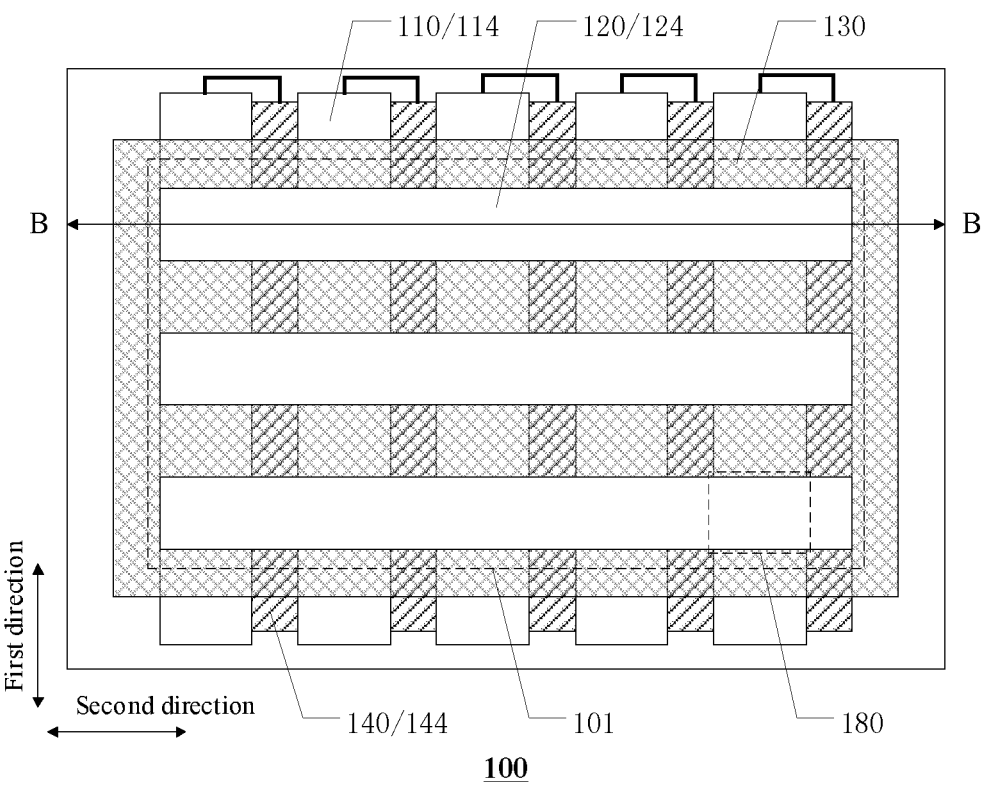
FIG. 8 is a planar diagram of another fingerprint identification structure provided by an embodiment of the present disclosure.

At least one embodiment of the present disclosure further provides a fingerprint identification module. FIG. 8 is a planar diagram of another fingerprint identification structure provided by an embodiment of the present disclosure; and FIG. 9 is a cross-sectional schematic diagram of a fingerprint identification structure along a BB direction in FIG. 8 provided by an embodiment of the present disclosure.

Figure 9:
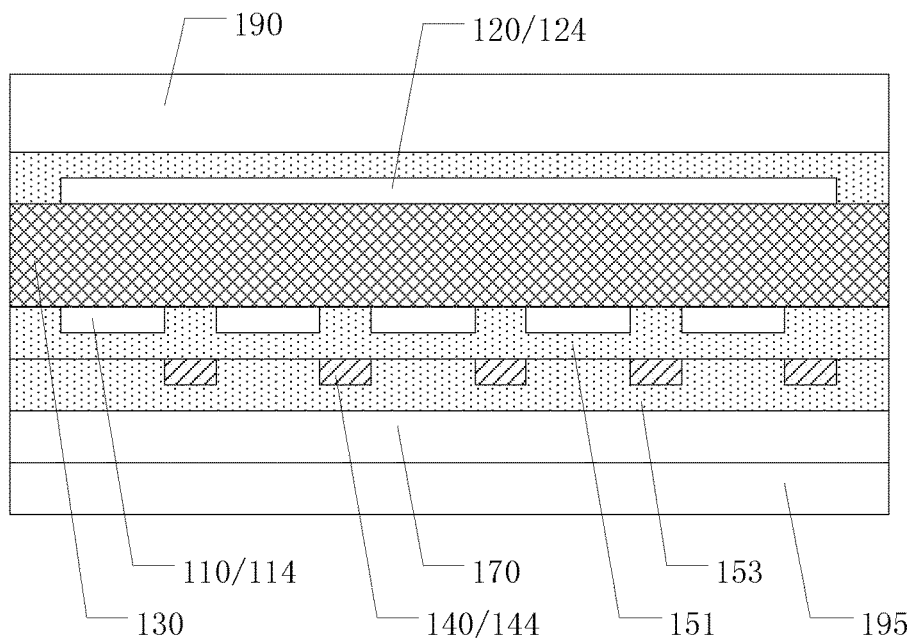
FIG. 9 is a cross-sectional schematic diagram of a fingerprint identification structure along a BB direction in FIG. 8 provided by an embodiment of the present disclosure.

As illustrated by FIGS. 8 and 9, each of the receiving electrodes 124 extends along the second direction, the M receiving electrodes 124 are arranged along the first direction, each of the driving electrodes 114 extends along the first direction, and the plurality of driving electrodes 114 are arranged along the second direction. At this time, the M receiving electrodes 124 and the N driving electrodes 114 are arranged cross each other, so that a plurality of cross regions 180 are formed, the piezoelectric material layers 130 located at each of the cross regions 180 may be driven or excited by the corresponding driving electrodes 114 and the receiving electrodes 124. At this time, the fingerprint identification structure 100 further includes the above-mentioned auxiliary driving electrode layer 140, the auxiliary driving electrode layer 140 is located on a side of the piezoelectric material layer 130 away from the receiving electrode layer 120, and is arranged in a different layer from the driving electrode layer 110; the auxiliary driving electrode layer 140 includes N auxiliary driving electrodes 144, the N driving electrodes 114 and the N auxiliary driving electrodes 144 are alternately arranged, the orthographic projection of the i-th auxiliary driving electrode 144 on the piezoelectric material layer 130 is overlapped with the interval between the orthographic projection of the i-th driving electrode 114 on the piezoelectric material layer 130 and the orthographic projection of the (i+1)-th driving electrode 114 on the piezoelectric material layer 130. Similarly, because the orthographic projection of the i-th auxiliary driving electrode 144 on the piezoelectric material layer 130 is overlapped with the interval between the orthographic projection of the i-th driving electrode 114 on the piezoelectric material layer 130 and the orthographic projection of the (i+1)-th driving electrode 114 on the piezoelectric material layer 130, the fingerprint identification structure can drive or excite the piezoelectric material layer located at the interval between adjacent driving electrodes by arranging the auxiliary driving electrode layer, so that the ultrasonic emission efficiency of the fingerprint identification structure is improved, and the ultrasonic emission efficiency is maximized.

Figure 10:
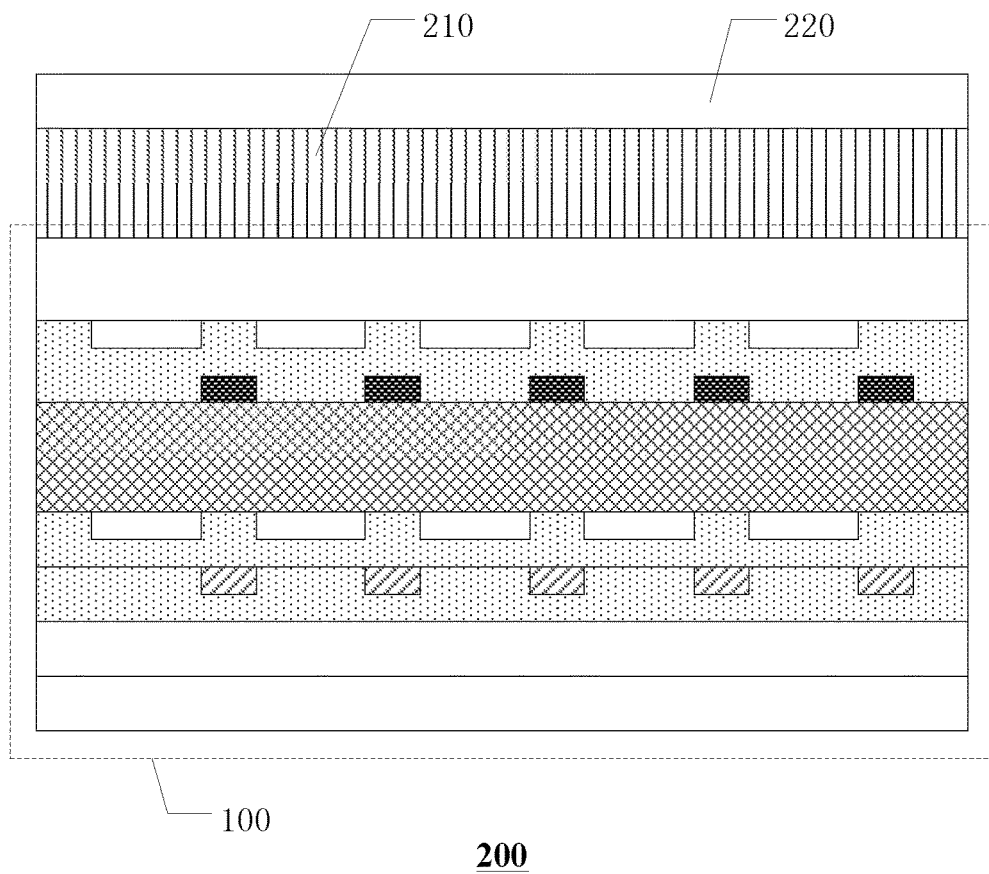
FIG. 10 is a structural schematic diagram of an electronic device provided by an embodiment of the present disclosure.

At least one embodiment of the present disclosure further provides an electronic device. FIG. 10 is a structural schematic diagram of an electronic device provided by an embodiment of the disclosure. As illustrated by FIG. 10, the electronic device 200 includes any one of the fingerprint identification structures 100 mentioned above. Because the orthographic projection of the i-th auxiliary driving electrode 144 on the piezoelectric material layer 130 is overlapped with the interval between the orthographic projection of the i-th driving electrode 114 on the piezoelectric material layer 130 and the orthographic projection of the (i+1)-th driving electrode 114 on the piezoelectric material layer 130, the fingerprint identification structure can drive or excite the piezoelectric material layer located at the interval between adjacent driving electrodes by arranging the auxiliary driving electrode layer, so that the ultrasonic emission efficiency of the fingerprint identification structure is improved, and the ultrasonic emission efficiency is maximized. Therefore, the electronic device can have a high fingerprint recognition performance. In some examples, as illustrated by FIG. 10, the electronic device 200 further includes a display module 210, and the display module 210 is located on a side of the receiving electrode layer 120 away from the driving electrode layer 110. At this time, the electronic device 200 can not only realize the fingerprint recognition function, but also realize the display function.

For example, the above-mentioned display module 210 may be a liquid crystal display module (LCD) or an organic light-emitting diode display module (OLED). Of course, the embodiments of the present disclosure include but are not limited to this.

In some examples, as illustrated by FIG. 10, the electronic device 200 further includes a cover plate 220, which is located on a side of the display module 210 away from the fingerprint identification structure 100. A surface of the cover plate 220 away from the fingerprint identification structure 100 can be used as a surface for touch operation.

Figure 11:
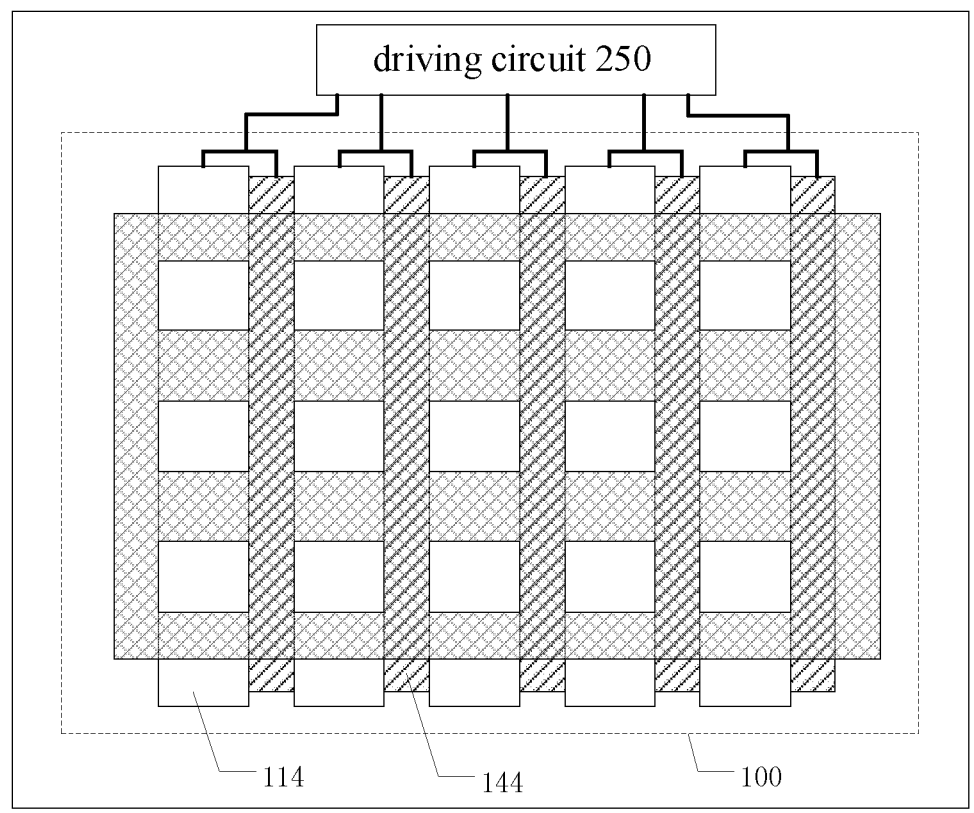
FIG. 11 is a structural schematic diagram of another electronic device provided by an embodiment of the present disclosure.

FIG. 11 is a structural schematic diagram of another electronic device provided by an embodiment of the disclosure. As illustrated by FIG. 11, the electronic device 200 further includes a driving circuit 250, which is electrically connected with the N driving electrodes 114 and the N auxiliary driving electrodes 144 respectively, and is configured to apply a same driving signal to the i-th driving electrode 114 and the i-th auxiliary driving electrode 144, is configured to apply a same driving signal to the N-th driving electrode 114 and the N-th auxiliary driving electrode 144. For example, the electronic device is an electronic equipment with a display function, such as a television, a mobile phone, a computer, a notebook computer, an electronic photo album, and a navigator.

At least one embodiment of the present disclosure further provides a driving method of a fingerprint identification structure. The driving method includes the following steps S101-S102.

Step S101: applying a driving voltage to the i-th driving electrode and the i-th auxiliary driving electrode to drive the piezoelectric material layer corresponding to the i-th driving electrode and the i-th auxiliary driving electrode to emit an ultrasonic wave.

Step S102: using the piezoelectric material layer to receive the ultrasonic wave reflected by a fingerprint, and outputting a corresponding fingerprint electrical signal through at least a part of the M receiving electrodes.

In the driving method of the fingerprint identification structure, after applying the driving voltage to the i-th driving electrode and the i-th auxiliary driving electrode, the piezoelectric material layer corresponding to the i-th driving electrode and the i-th auxiliary driving electrode will deform due to the inverse piezoelectric effect or drive film layers above and below the piezoelectric material layer to vibrate together, so that the ultrasonic wave can be generated and emitted outward. In this way, compared with the case of driving only by the driving electrodes, the driving method can drive or excite a larger area of the piezoelectric material layer through the i-th driving electrode and the i-th auxiliary driving electrode, so that the ultrasonic emission efficiency of the fingerprint identification structure is improved and the ultrasonic emission efficiency is maximized. Therefore, the electronic device can have high fingerprint recognition performance.

The following points required to be explained:
(1) the drawings of the embodiments of the present disclosure only relate to the structures related to the embodiments of the present disclosure, and other structures can refer to the general design.
(2) without conflict, the embodiments of the present disclosure and the features in the embodiments may be combined with each other to obtain new embodiments.

The above are only the specific embodiments of this disclosure, but the scope of protection of this disclosure is not limited to this. Any person familiar with this technical field can easily think of changes or substitutions within the technical scope disclosed in this disclosure, which should be covered by the scope of protection of this disclosure. Therefore, the scope of protection of this disclosure should be based on the scope of protection of the claims.

What is claimed is:

1. A fingerprint identification structure, comprising:
a driving electrode layer, comprising N driving electrodes arranged at intervals;
a piezoelectric material layer, located on a side of the driving electrode layer;
a receiving electrode layer, located on a side of the piezoelectric material layer away from the driving electrode layer, and comprising M receiving electrodes;
an auxiliary driving electrode layer, located on a side of the piezoelectric material layer away from the receiving electrode layer, and arranged in a different layer from the driving electrode layer; and
a first insulating layer, located between the driving electrode layer and the auxiliary driving electrode layer,
wherein the auxiliary driving electrode layer comprises N auxiliary driving electrodes, the N driving electrodes and the N auxiliary driving electrodes are alternately arranged, an orthographic projection of an i-th auxiliary driving electrode on the piezoelectric material layer is overlapped with an interval between an orthographic projection of an i-th driving electrode on the piezoelectric material layer and an orthographic projection of an (i+1)-th driving electrode on the piezoelectric material layer, M is a positive integer greater than or equal to 2, N is a positive integer greater than or equal to 2, and i is a positive integer greater than or equal to 1 and less than N.

2. The fingerprint identification structure according to claim 1, wherein the interval between the orthographic projection of the i-th driving electrode on the piezoelectric material layer and the orthographic projection of the (i+1)-th driving electrode on the piezoelectric material layer completely falls in the orthographic projection of the i-th auxiliary driving electrode on the piezoelectric material layer.

3. The fingerprint identification structure according to claim 1, wherein the i-th driving electrode and the i-th auxiliary driving electrode are configured to receive a same driving signal, and an N-th driving electrode and an N-th auxiliary driving electrode are configured to receive a same driving signal.

4. The fingerprint identification structure according to claim 1, wherein the fingerprint identification structure comprises a fingerprint identification area and a peripheral area surrounding the fingerprint identification area,
the i-th driving electrode and the i-th auxiliary driving electrode are electrically connected in the peripheral area, and an N-th driving electrode and an N-th auxiliary driving electrode are electrically connected in the peripheral area.

5. The fingerprint identification structure according to claim 1, wherein an orthographic projection of an N-th auxiliary driving electrode on the piezoelectric material layer is located on a side of an orthographic projection of an N-th driving electrode on the piezoelectric material layer away from an (N−1)-th driving electrode.

6. The fingerprint identification structure according to claim 1, wherein the M receiving electrodes are arranged in an array along a first direction and a second direction, the second direction intersects with the first direction, each of the driving electrodes extends along the first direction, the N driving electrodes are arranged along the second direction,
an orthographic projection of each of the N driving electrodes on the piezoelectric material layer is overlapped with at least a part of orthographic projections of the M receiving electrodes arranged along the first direction on the piezoelectric material layer.

7. The fingerprint identification structure according to claim 6, further comprising:
a conductive auxiliary layer, located on a side of the piezoelectric material layer away from the driving electrode layer, and arranged in a different layer from the receiving electrode layer,
wherein an orthographic projection of the conductive auxiliary layer on the piezoelectric material layer is overlapped with intervals among orthographic projections of the M receiving electrodes on the piezoelectric material layer.

8. The fingerprint identification structure according to claim 7, wherein the conductive auxiliary layer is a conductive mesh, and the conductive mesh is arranged around the M receiving electrodes.

9. The fingerprint identification structure according to claim 8, wherein an orthographic projection of the i-th auxiliary driving electrode on the piezoelectric material layer is overlapped with an orthographic projection of the conductive mesh on the piezoelectric material layer, and an orthographic projection of an N-th auxiliary driving electrode on the piezoelectric material layer is overlapped with the orthographic projection of the conductive mesh on the piezoelectric material layer.

10. The fingerprint identification structure according to claim 7, wherein the conductive auxiliary layer is configured to be connected to a fixed potential or ground.

11. The fingerprint identification structure according to claim 7, further comprising:
   a second insulating layer, located between the conductive auxiliary layer and the receiving electrode layer.

12. The fingerprint identification structure according to claim 1, wherein the auxiliary driving electrode layer is located on a side of the driving electrode layer away from the piezoelectric material layer.

13. The fingerprint identification structure according to claim 1, further comprising:
   an acoustic wave reflection layer, located on a side of the auxiliary driving electrode layer away from the piezoelectric material layer; and
   a third insulating layer, located between the acoustic wave reflection layer and the auxiliary driving electrode layer.

14. The fingerprint identification structure according to claim 1, wherein material of the piezoelectric material layer comprises polyvinylidene fluoride.

15. An electronic device, comprising the fingerprint identification structure according to claim 1.

16. The electronic device according to claim 15, further comprising:
   a driving circuit, wherein the driving circuit is electrically connected with the N driving electrodes and the N auxiliary driving electrodes respectively, and is configured to apply a same driving signal to the i-th driving electrode and the i-th auxiliary driving electrode, and is configured to apply a same driving signal to an N-th driving electrode and an N-th auxiliary driving electrode.

17. A driving method of a fingerprint identification structure according to claim 1, comprising:
   applying a driving voltage to the i-th driving electrode and the i-th auxiliary driving electrode to drive the piezoelectric material layer corresponding to the i-th driving electrode and the i-th auxiliary driving electrode to emit an ultrasonic wave; and
   using the piezoelectric material layer to receive the ultrasonic wave reflected by a fingerprint, and outputting a corresponding fingerprint electrical signal through at least a part of the M receiving electrodes.

* * * * *